US012354410B2

(12) United States Patent
Mya et al.

(10) Patent No.: US 12,354,410 B2
(45) Date of Patent: Jul. 8, 2025

(54) INFORMATION PROCESSING DEVICE AND INFORMATION PROCESSING PROGRAM

(71) Applicant: TOSHIBA TEC KABUSHIKI KAISHA, Tokyo (JP)

(72) Inventors: Thandar Mya, Mishima Shizuoka (JP); Yuishi Takeno, Numazu Shizuoka (JP); Keita Yamazaki, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 329 days.

(21) Appl. No.: 17/890,669

(22) Filed: Aug. 18, 2022

(65) Prior Publication Data

US 2023/0106286 A1 Apr. 6, 2023

(30) Foreign Application Priority Data

Sep. 24, 2021 (JP) .................................. 2021-155556

(51) Int. Cl.
*G06V 40/20* (2022.01)
*G06Q 50/12* (2012.01)
*G06V 40/16* (2022.01)

(52) U.S. Cl.
CPC ............. *G06V 40/28* (2022.01); *G06Q 50/12* (2013.01); *G06V 40/161* (2022.01)

(58) Field of Classification Search
CPC ......... G06F 3/017; G06V 40/28; G06V 40/20
See application file for complete search history.

(56) References Cited

U.S. PATENT DOCUMENTS

| 10,817,067 | B2 | 10/2020 | Katz |
| 10,863,056 | B2 | 12/2020 | Sakashita |
| 2014/0063054 | A1 | 3/2014 | Osterhout et al. |
| 2019/0102830 | A1* | 4/2019 | Yin ..................... G06Q 20/3276 |
| 2019/0236377 | A1* | 8/2019 | Otake .................... G06V 20/52 |

FOREIGN PATENT DOCUMENTS

| CN | 112686169 A | 4/2021 |
| JP | 2013196329 A | 9/2013 |
| JP | 2016523420 A | 8/2016 |
| JP | 2019159573 A | 9/2019 |

OTHER PUBLICATIONS

Viola, Paul, and Michael J. Jones. "Robust real-time face detection." International journal of computer vision 57 (2004): 137-154. (Year: 2004).*
Japanese Office Action dated Mar. 25, 2025, mailed in counterpart Japanese Application No. 2021-155556, 10 pages (with translation).

* cited by examiner

*Primary Examiner* — Raphael Schwartz
(74) *Attorney, Agent, or Firm* — Kim & Stewart LLP

(57) ABSTRACT

According to one embodiment, an information processing device for a gesture-based ordering taking system or the like includes a processor. The processor is configured to detect a person making a particular gesture in image data from a camera, identify each person making the particular gesture in the image data as a first type person, then identify each first type person meeting a candidate condition in the image data as a candidate. The processor then designates a candidate as a subject according to a subject selection condition, and then detects gestured-based input from the subject in additional image data from the camera after the subject has been designated.

19 Claims, 6 Drawing Sheets

INFORMATION PROCESSING DEVICE AND INFORMATION PROCESSING PROGRAM

CROSS-REFERENCE TO RELATED APPLICATION

This application is based upon and claims the benefit of priority from Japanese Patent Application No. 2021-155556, filed Sep. 24, 2021, the entire contents of which are incorporated herein by reference.

FIELD

Embodiments described herein relate generally to an information processing device and an information processing program related to gesture-based, self-service ordering systems.

BACKGROUND

In some stores, such as restaurants, a self-service ordering system (also referred to as a "self-ordering system" or "a self-order system") with which a customer inputs an order into a terminal or ordering kiosk by himself/herself has been introduced. In some such systems, the customer may input an order at the terminal without touching the terminal to do so.

For example, as a touchless ordering process, a customer's hand gesture made in front of the terminal display screen or the like may be recognized by using a camera to identify a customer's intention with respect to an ordering process.

As part of a hand gesture-based ordering process, the self-ordering system needs to identify the person (customer) who wants to input an order and also recognize the order being input by the person. In general, with self-ordering systems of the related art, accuracy in identifying the person intending to enter an order needs to be improved in order to avoid inputting erroneous order information due to a recognition of a hand gesture from a person (e.g., a bystander or another person accompanying the person making the order) who is not the person making the order.

DETAILED DESCRIPTION

Embodiments described herein provide an information processing device and an information processing program that can achieve greater accuracy in identifying the appropriate person to be permitted to enter an order based on imaging data of a gesture-based ordering process or the like.

According to one embodiment, an information processing device includes a processor. The processor is configured to detect a person making a particular gesture in image data from a camera, identify each person making the particular gesture in the image data as a first type person, then identify each first type person meeting a candidate condition in the image data as a candidate. The processor then designates a candidate as a subject according to a subject selection condition, and then detects gestured-based input from the subject in additional image data from the camera after the subject has been designated.

Hereinafter, certain example embodiments will be described with reference to the accompanying drawings.

Configuration Example

Figure 1:
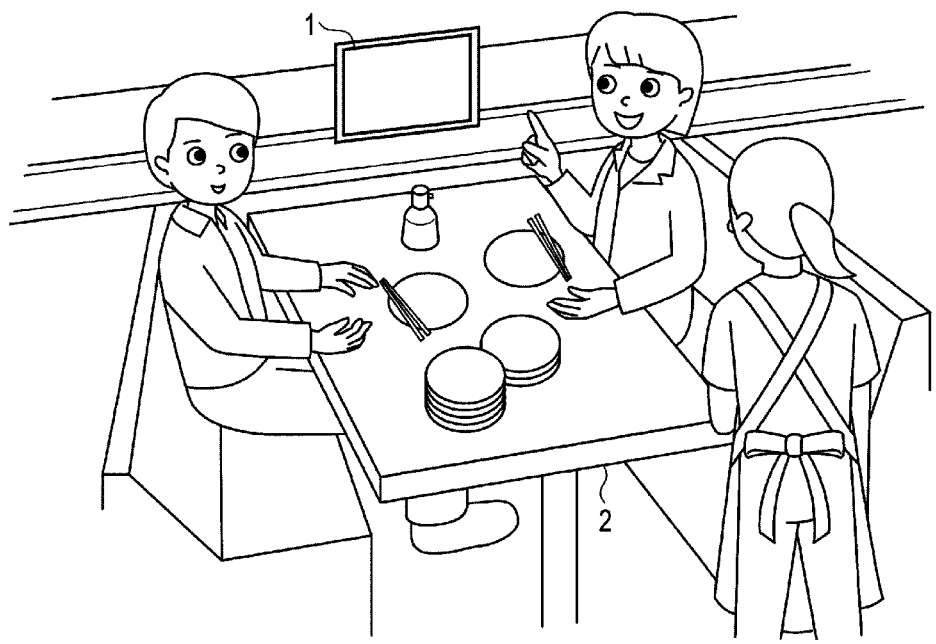
FIG. 1 depicts an example of a terminal and a use case according to an embodiment.

A terminal 1 as shown in FIG. 1 is one example of an information processing device and is an electronic device with which an order can be made by a customer with a gesture without touching the terminal 1. As one example usage scenario, the terminal 1 is installed inside a store, such as a restaurant, in association with a table 2 where goods and/or services are provided to one or more customers. The store may include a plurality of terminals and a plurality of tables, but for the sake of simplification of description, the example shown in FIG. 1 is related to the scenario where one terminal 1 and one table 2 associated with each other are provided.

The terminal 1 includes a camera whose imaging range includes a first region associated with the terminal 1. The first region is a three-dimensional region or space where all customers are assumed to be seated and present around the table 2 for eating and drinking in a usual or regular situation. For example, the first region includes the table 2 and one or more seats or chairs placed around the table 2. A range or a size of the first region can be appropriately set in advance. The first region is an example of a predetermined region.

Since the imaging range of the terminal 1 includes the first region, image data acquired by the terminal 1 using the camera will include all seated customers around the table 2 present in the first region. The imaging range of the terminal 1 may include not only the first region but also at least part of a second region. The second region is different from the first region. The image data acquired by the terminal 1 may include one or more persons present in the second region. In one instance, the image data acquired by the terminal 1 may include, as those present in the second region, one or more customers seated around a table that is different from the table 2 and is included in the second region. In another instance, the image data acquired by the terminal 1 may include, as those present in the second region, one or more customers or servers who pass through an aisle that is near the table 2 and is included in the second region.

All persons present in the first region are those who may input or enter an order to the terminal 1 by a gesture. When a customer starts to make his or her order, the customer performs a first gesture to cause the terminal 1 to recognize that specific customer as one subject who is an originator of the order and continues to complete the order. An example of the first gesture is a gesture of raising a hand. The first gesture is, however, not limited thereto and can be appropriately set in advance. The first gesture in this context is some predetermined gesture which may be taken as an attempt to by a customer to interact with the terminal 1 for the purpose of making an order or otherwise.

The customer who has been recognized as one subject by the terminal 1 subsequently performs a second gesture to complete the order at the terminal 1 after the first gesture. The second gesture may vary depending on an order and include various gestures for ordering various foods and drinks. For example, the second gesture may include a gesture of moving a cursor displayed on the terminal 1 to select foods and drinks from food and drink menus or lists displayed on the terminal 1 and a gesture for confirming the selected foods and drinks. The second gesture may also include a gesture for inputting the number of foods and drinks to be ordered. For example, the second gesture may include a gesture of moving a cursor displayed on the terminal 1 to select the number of foods and drinks to be ordered from a plurality of selectable numbers displayed on the terminal 1 and a gesture for confirming the selected number of foods and drinks.

Figure 2:
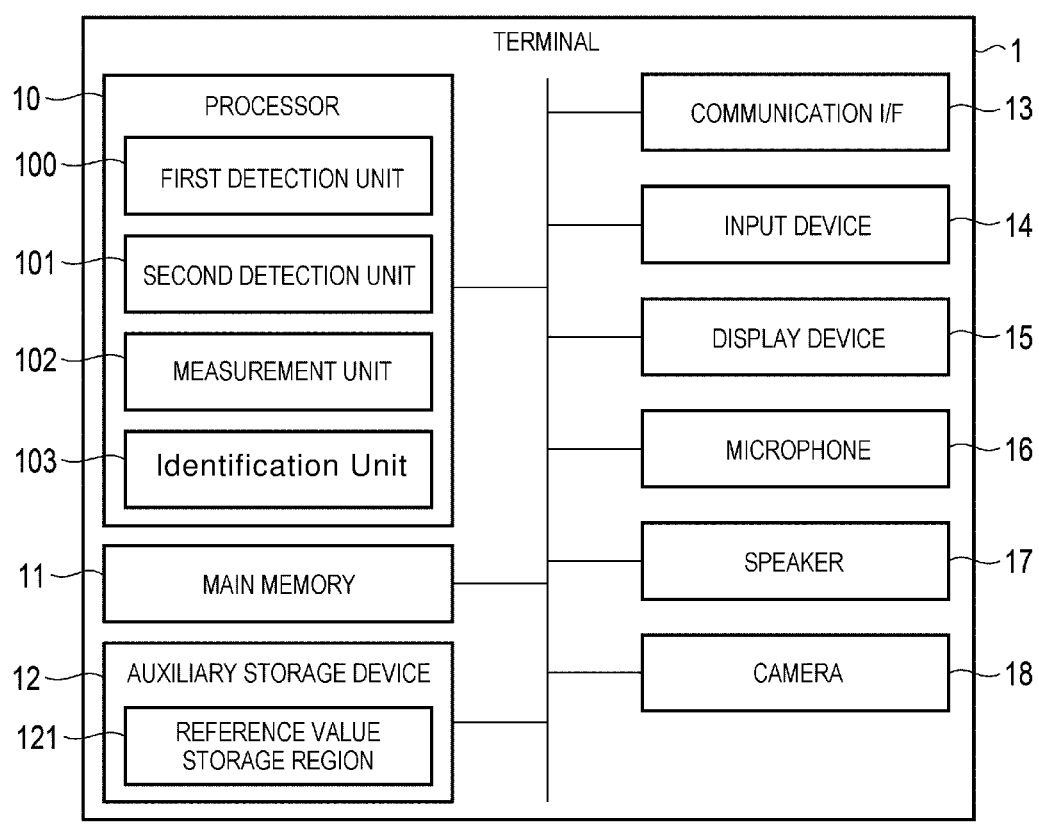
FIG. 2 is a block diagram of a terminal according to an embodiment.

As shown in FIG. 2, the terminal 1 includes a processor 10, a main memory 11, an auxiliary storage device 12, a communication interface (I/F) 13, an input device 14, a display device 15, a microphone 16, a speaker 17, and a camera 18. The units constituting the terminal 1 are connected to each other such that signals can be input and output.

The processor 10 corresponds to a central part of a computer of the terminal 1. For example, the processor 10 is a central processing unit (CPU), but is not limited thereto. The processor 10 may include various circuits. The processor 10 loads, in the main memory 11, a program stored in the main memory 11 or the auxiliary storage device 12. The program when executed implements various units in the processor 10 of the terminal 1. The processor 10 executes various operations by executing the program loaded in the main memory 11.

The main memory 11 corresponds to a main storage part of the computer of the terminal 1. The main memory 11 includes a non-volatile memory region and a volatile memory region. The main memory 11 stores an operating system or a program in the non-volatile memory region. The main memory 11 uses the volatile memory region as a work area in which data are appropriately rewritten by the processor 10. For example, the main memory 11 includes a read only memory (ROM) as the non-volatile memory region. For example, the main memory 11 includes a random-access memory (RAM) as the volatile memory region.

The auxiliary storage device 12 corresponds to an auxiliary storage part of the computer of the terminal 1. For example, the auxiliary storage device 12 is an electric erasable programmable read-only memory (EEPROM) (registered trademark), a hard disk drive (HDD), and a solid-state drive (SSD), but is not limited thereto. The auxiliary storage device 12 stores the program, data to be used when the processor 10 performs various processes, and data generated by the processor 10 performing the processes.

The auxiliary storage device 12 includes a reference value storage region 121 for storing a region identification reference value DF. The reference value storage region 121 is an example of a storage unit. The region identification reference value DF serves as a region identification reference for identifying or determining whether a region where a person is present is the first region or the second region by comparison with a measurement value F.

The region identification reference value DF is based on one or more distances measured between parts of a face of a reference person captured in a frame of a moving image included in the image data. The reference person is a person having an average face as a reference. The reference person may be a real person or a virtual person. The face parts may include left and right eyes of the reference person, and as one example, the distance or distances between the face parts may be either one or both of an inner canthus width and an outer canthus width of the reference person. The inner canthus width is a straight line distance connecting left and right inner canthi of left and right eyes. The outer canthus width is a straight line distance connecting left and right outer canthi of left and right eyes. Examples of such distances and face parts are, however, not limited thereto. The distances between the face parts of the reference person may be those measured between other face parts than left and right eyes of the reference person. Herein, an instance where the face part distances of the reference person include both the inner canthus width and the outer canthus width of the reference person is mainly described as a representative example according to the present embodiment. In such an instance, a value based on the face part distances of the reference person may be obtained by summing the inner canthus width and the outer canthus width of the reference person. The region identification reference value DF may be an average value of values obtained by summing the inner canthus widths and the outer canthus widths of a plurality of reference persons.

The measurement value F is based on one or more distances measured between face parts of a person captured in a frame of a moving image included in the image data. For example, the distance or distances between face parts of a person that are to be used for obtaining the measurement value F may be either one or both of an inner canthus width $f_{in}$ and an outer canthus width $f_{out}$ of the person. Examples of such distances and face parts are, however, not limited thereto. The distances between face parts of a person may be those measured between other face parts than left and right eyes of the person. Herein, an instance where the face part distances of a person include both the inner canthus width $f_{in}$ and the outer canthus width $f_{out}$ of the person is mainly described as a representative example according to the present embodiment. In such an instance, the measurement value F may be obtained by summing the inner canthus width $f_{in}$ and the outer canthus width $f_{out}$ of the person.

If the measurement value F satisfies the region identification reference value DF or the region identification reference, then a region where the person is present is the first region. If the measurement value F that does not satisfy the region identification reference value DF or the region identification reference, then a region where the person is present is the second region.

The region identification reference value DF includes a lower limit value $DF_1$ associated with a position in the first region farthest from the camera 18. The lower limit value $DF_1$ is based on one or more distances between parts of a face of a reference person assumed to be present at the position in the first region farthest from the camera 18. Here, it is assumed that the lower limit value $DF_1$ is obtained by summing an inner canthus width $f_{in1}$ and an outer canthus width $f_{out1}$ of the reference person when at the position in the first region farthest from the camera 18.

A size of an object in the frame of the image data increases as the object gets closer to the camera 18. When the measurement value F is equal to or greater than the lower limit value $DF_1$, the person is present in the first region. The measurement value F being equal to or greater than the lower limit value $DF_1$ is an example of the measurement value F satisfying a region identification reference. If the measurement value F is less than the lower limit value $DF_1$, the person is in the second region (that is, outside the first region). The measurement value F being less than the lower limit value $DF_1$ is an example of the measurement value F not satisfying a region identification reference.

The camera 18 may be installed at a position away from the table 2 and need not be adjacent to the first region. In such a case, the region identification reference value DF may encompass an upper limit value $DF_2$ that is associated with the position in the first region closest to the camera 18. The upper limit value $DF_2$ is based on one or more distances between parts of a face of a reference person assumed to be present at the position in the first region closest to the camera 18. Here, it is assumed that the upper limit value $DF_2$ is a value obtained by summing an inner canthus width $f_{in2}$ and an outer canthus width $f_{out2}$ of the reference person when at the position in the first region closest to the camera 18.

If the measurement value F is between the lower limit value $DF_1$ the upper limit value $DF_2$, the person is recognized as being present in the first region. If the measurement value F is greater than the upper limit value $DF_2$, the person is recognized as being in the second region.

The communication interface 13 includes various interfaces that connect the terminal 1 to other devices via a network or the like according to a communication protocol or the like.

The input device 14 is capable of sending data or an instruction to the terminal 1 by a touch operation or the like. For example, the input device 14 is a keyboard or a touch panel. Examples of the input device 14 are, however, not limited thereto.

The display device 15 is capable of displaying various images under the control of the terminal 1. For example, the display device 15 is a liquid crystal display. Examples of the display device 15 are, however, not limited thereto.

The microphone 16 is capable of receiving sound from the environment near the terminal 1.

The speaker 17 is capable of outputting sound under the control of the terminal 1.

The camera 18 is capable of acquiring image data in the imaging range of the terminal 1. For example, the camera 18 acquires video images, video data, or other imaging data. The camera 18 is one example of an imaging unit.

The hardware configuration of the terminal 1 is not limited to the above-mentioned configuration. The components, parts, units, elements, or the like of the terminal 1 can be appropriately omitted and/or changed, and new components, parts, units, elements, or the like can be appropriately added. For example, the display device 15 may be a separate device from and not part of the terminal 1. The camera 18 may be a separate device from and not part of the terminal 1.

The processor 10 implements a first detection unit 100, a second detection unit 101, a measurement unit 102, and an identification unit 103. The units implemented by the processor 10 can also be referred to as functions. The units implemented by the processor 10 can also be implemented by a control unit that includes the processor 10 and the main memory 11.

The first detection unit 100 detects a first gesture (first-type gesture) based on image data or the like from the camera 18. The first detection unit 100 may detect the first gesture in the image data by using well-known image processing techniques or the like. For example, the first detection unit 100 detects a hand of a person in a frame of a moving image. The image data may comprise multiple frames of the moving image the detection of a hand may involve the detection of the hand in a plurality of consecutive frames. For example, detection may require the hand to be recognized in a predetermined number of frames such as 15 frames, but is not limited thereto. The first detection unit 100 may attempt to detect a hand at predetermined intervals corresponding to the predetermined number of frames.

The first detection unit 100 detects a plurality of key points, such as coordinates, of a hand of a person in the image data. The first detection unit 100 acquires key point information including the plurality of key points. The first detection unit 100 classifies a gesture of the detected hand into either a first gesture or a second gesture (second-type gesture) based on the acquired key point information. The second gesture is distinct from the first gesture.

In some examples, the first detection unit 100 may classify (detect) hand gestures by a deep neural network that implements a gesture classification model. The gesture classification model may be a trained model that classifies a detected movements of a hand or the like into first gestures and second gestures based on the supplied key point information. The gesture classification model may be stored in the auxiliary storage device 12.

The second detection unit 101 detects a posture of a person based on the image data. The second detection unit 101 may detect the posture of a person based on the image data by using well-known image processing techniques or the like. For example, the second detection unit 101 detects a body of a person in a frame of a moving image included in the image data then detects a plurality of key points, such as coordinates, of a body of a person from the image data. The second detection unit 101 acquires key point information including the plurality of key points. The second detection unit 101 classifies the posture of a person into a first posture or a second posture based on the acquired key point information. The first posture is, in this example, a seated posture, but the present disclosure is not limited thereto. The first posture can be appropriately set based on known or expected arrangements around table 2 or the like. The second posture can be any posture different from the first posture.

The second detection unit 101 may classify the posture of a person using a deep neural network that implements a posture classification model. The posture classification model may be a trained model that classifies a posture of a person into the first posture or the second posture based on the key point information. The posture classification model may be stored in the auxiliary storage device 12. The second detection unit 101 detects the posture of a person based on the posture classification. The second detection unit 101 is an example of the detection unit.

The measurement unit 102 measures distances between parts of a face of a person in the image data. The measurement unit 102 acquires a measurement value F based on the measured distances between the face parts of a person in the image data. For example, the measurement unit 102 may apply an image processing technique to the image data to measure the face part distances and acquire the measurement values F.

For example, the measurement unit 102 detects a face of a person in a frame of a moving image. The measurement unit 102 detects a plurality of key points of the detected face. The measurement unit 102 acquires key point information including the plurality of key points. The measurement unit 102 measures one or more distances between parts of the detected face based on the acquired key point information.

The identification unit 103 identifies one or more first persons in the image data. In this context, a "first person" is a person has been detected by the first detection unit 100 as making the first gesture. For example, the identification unit 103 identifies one or more first persons in a frame of the moving image.

The identification unit 103 then identifies one or more candidates who satisfy a candidate identification condition from among the identified first persons.

The candidate identification condition may be based on the person (the detected "first person") being present in the first region. As such, satisfying a candidate identification condition includes a case where the measurement value F of the first person satisfies the region identification reference. Not satisfying the candidate identification condition includes a case where the measurement value F of the first person does not satisfy the region identification reference.

In this example, the identification unit 103 may also identify one or more "second persons" from among the identified first persons. A "second person" in this context is a first person that is determined to be present inside the first region.

For example, the identification unit 103 identifies one or more second persons from among the first persons by using the measurement values F of the respective first persons based on the distance measurements of the measurement unit 102.

In this example, the identification unit 103 identifies a region for each detected first person in which the respective first person is present based on the corresponding measurement values F. The specification unit 103 compares the region specification reference value DF with the corresponding measurement values F of the first persons as acquired by the measurement unit 102. The identification unit 103 identifies the region where each corresponding first person is present based on the comparison between the corresponding measurement value F for first person and the region specification reference value DF.

When the measurement value F for a first person satisfies a region specification reference value, the identification unit 103 identifies the region where the first person is located as the first region. When the measurement value F does not satisfy the region specification reference value, the identification unit 103 identifies, the region where the first person is located as the second region.

An example in which the region identification reference value DF is based on the lower limit value $DF_1$ will be described. The identification unit 103 identifies the region where a first person associated with a measurement value F that is equal to or greater than the lower limit value $DF_1$ is located as the first region. The identification unit 103 identifies the region where a first person associated with a measurement value F that is less than the lower limit value $DF_1$ is located as the second region.

An example in which the region specification reference value DF encompasses the lower limit value $DF_1$ and the upper limit value $DF_2$ will be described. The identification unit 103 identifies, a first person as being in the first region when the measurement value F associated with the first person is equal to or greater than the lower limit value $DF_1$ but less than or equal to the upper limit value $DF_2$. Any first person not in the first region can be considered as being in the second region.

The identification unit 103 identifies one or more second persons from the first persons based on the identification of the region where the corresponding first person is present. The identification unit 103 then identifies one or more candidates from the identified second persons. The identification unit 103 identifies the one or more second persons who satisfy the candidate specification condition as a candidate. There may be more than one second persons identified as a candidate at this time.

The candidate identification condition may include a person being in the first posture in addition to being present in the first region. Satisfying the candidate identification condition includes a case where the measurement value F of the first person satisfies the region identification reference and a posture of the first person is the first posture.

In this present example, the identification unit 103 identifies one or more third persons from the first persons based on the image data. In this context, a "third person" is a first person who is present in the first region and is also in the first posture. The third person can also be considered a "second person" who is also in the first posture.

For example, in the present embodiment, the identification unit 103 first identifies the second persons from among the identified first persons based, then identifies third persons from the identified second persons.

The identification unit 103 then identifies one or more candidates among the identified third persons. Identifying the candidates among the third persons can be considered equivalent to identifying the candidates from among the identified second persons.

After identifying one or more candidates, the identification unit 103 then identifies one "subject" (also referred to as a "primary customer") from the candidates. If there is only one candidate (e.g., one person who satisfies the candidate specification condition(s)), the identification unit 103 regards this candidate as the subject. If there is a plurality of candidates, the identification unit 103 selects one candidate from the plurality of candidates based on a subject identification condition.

In one example, the subject identification condition is based on a detection timing of the first gesture by the first detection unit 100. For example, the candidate with the earliest first gesture detection timing is selected as the subject. For example, the specification unit 103 compares a time-series order of frames corresponding to the candidates and establishes a start of the first gesture by each of the plurality of candidates.

In another example, the subject identification condition is based on a distance from a reference position. For example, the candidate closest to the reference position is selected as the subject. The reference position may be the position of the camera 18, but is not limited thereto. In general, the reference position in this context may be any position within the first region. In this example, when a plurality of candidates are identified, the identification unit 103 selects the candidate the closest to the reference position to be the subject from among the plurality of candidates. For example, the identification unit 103 compares measurement values F of the plurality of candidates as acquired by the measurement unit 102.

An example in which the reference position is the position of the camera 18 will be described. The measurement value F increases as a person approaches the position of the camera 18. Thus, the identification unit 103 selects, as the subject, the candidate having the largest measurement value F from among the plurality of candidates.

An example in which the reference position is any arbitrary position within the first region will be described. The identification unit 103 selects, as one subject, the candidate whose measurement value F is closest to a reference value $DF_3$ for the reference position within the first region. The reference value $DF_3$ in some examples may be a value based on one or more distances between parts of a face of a reference person who is assumed to be present at the reference position within the first region. The one or more distances are measured based on the frame(s) of the moving image. In one instance, the reference value $DF_3$ may be obtained by summing an inner canthus width $f_{in3}$ and an outer canthus width $f_{out3}$ of the reference person. The reference value $DF_3$ may be stored in the auxiliary storage device 12.

The first region associated with the terminal 1 will be described.

Figure 3:
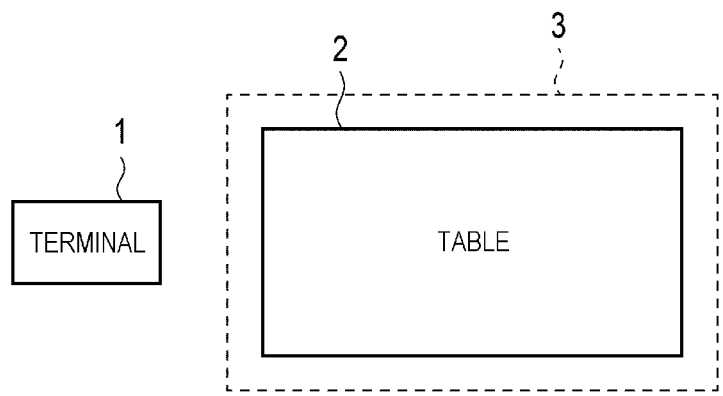
FIG. 3 is a diagram of an example of a first region associated with a terminal according to an embodiment.

FIG. 3 shows an example of the terminal 1 in a plan view and an example of the table 2 viewed from above in a vertical direction according to the present embodiment. As shown in FIG. 3, the first region 3 includes the table 2. The first region 3 may include seats (not separately depicted) placed around the table 2. The terminal 1 acquires moving image data with at least the first region 3 as the imaging range.

Figure 4:
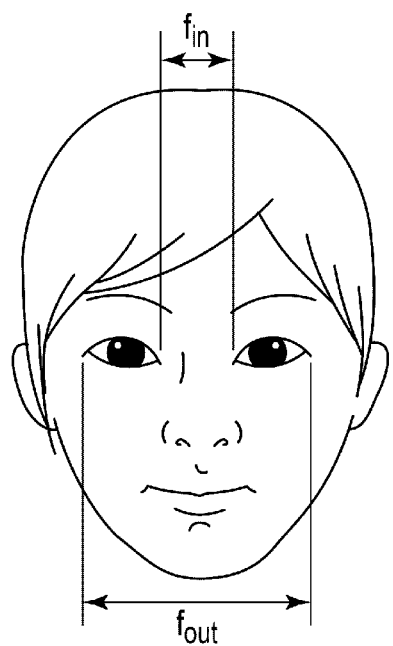
FIG. 4 is a diagram of an example measurement by a terminal according to an embodiment.

FIG. 4 is a diagram showing a measurement example by the terminal 1.

FIG. 4 shows an example of the inner canthus width $f_{in}$ and an outer canthus width $f_{out}$ of a person measured by the measurement unit 102. The measurement unit 102 acquires a measurement value F obtained by summing the measurement values of the inner canthus width $f_{in}$ and the outer canthus width $f_{out}$ of the person.

Operations

Next, an operation of the terminal 1 configured as described above will be described.

Figure 5:
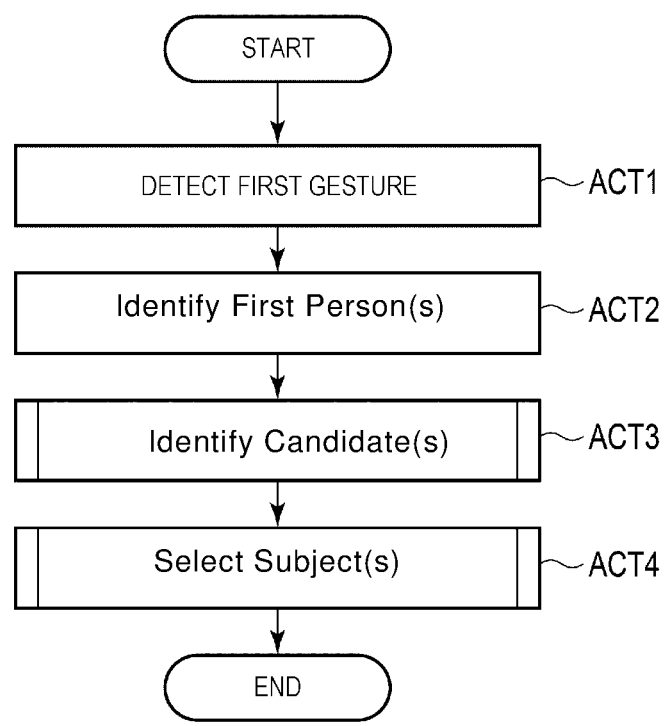
FIG. 5 is a flowchart of an example procedure of information processing according to an embodiment.

FIG. 5 is a flowchart of an example procedure of information processing to be performed by the terminal 1 according to the present embodiment. The information processing procedure described herein is merely an example and can be changed as appropriate. For example, according to a modified embodiment, an action or a process of the procedure may be appropriately omitted, replaced, and/or added.

The first detection unit 100 detects a first gesture based on image data (ACT 1). In ACT 1, the first detection unit 100 may detect a first gesture of one person or a plurality of first gestures of a plurality of persons.

The identification unit 103 identifies as first persons those for which a first gesture has been detected by the first detection unit 100 based on the image data (ACT 2).

The identification unit 103 then identifies, based on the image data, one or more candidates who satisfy the candidate identification condition from among the identified first persons (ACT 3).

The identification unit 103 selects one subject form among the identified candidates (ACT 4).

Figure 6:
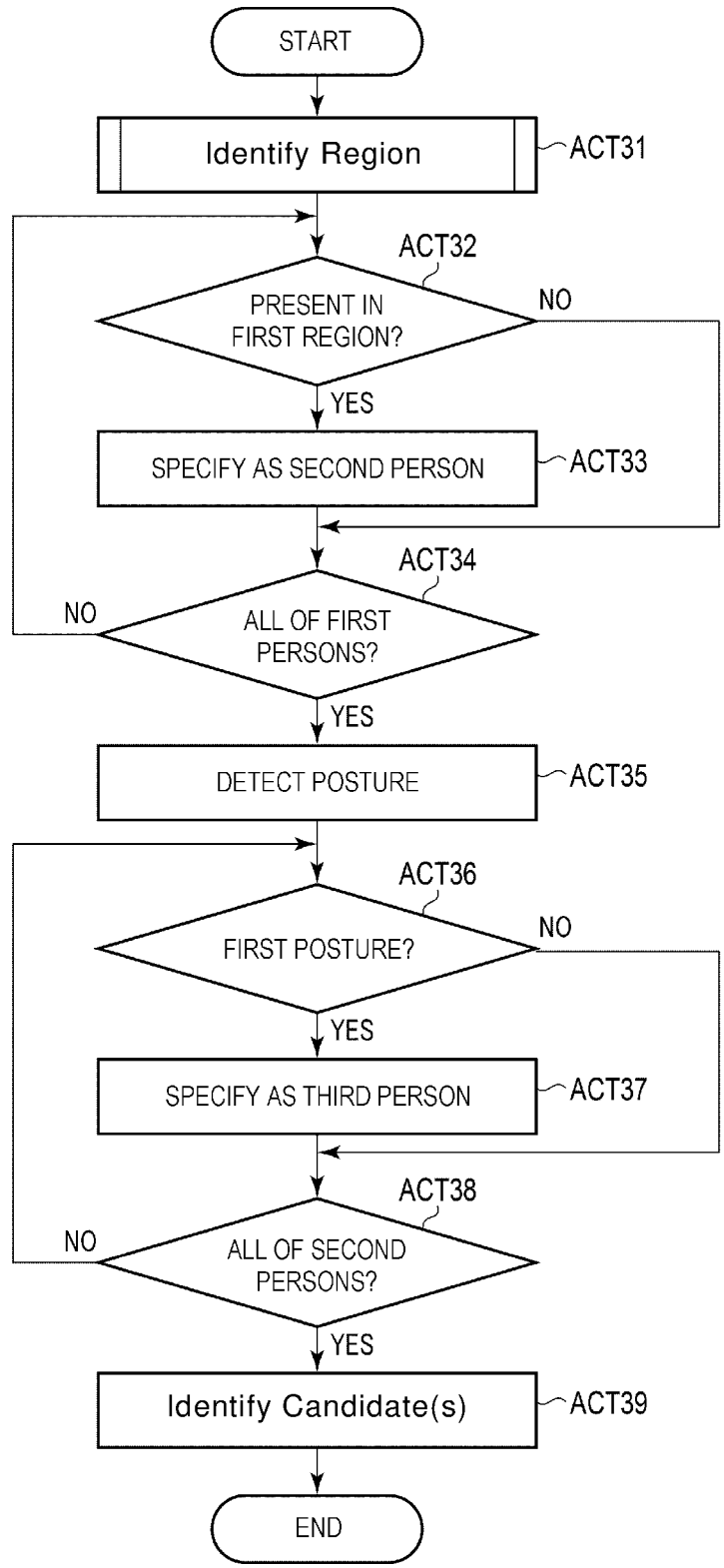
FIG. 6 is a flowchart of an example procedure of candidate identification according to an embodiment.

FIG. 6 is a flowchart of an example procedure of the candidate identification to be performed by the terminal 1 in ACT 3. The candidate identification condition in the present example procedure includes being in the first posture in addition to being present in the first region.

The candidate identification procedure described here is merely an example and can be changed as appropriate. For example, according to a modified embodiment, an action or a process of the procedure may be appropriately omitted, replaced, and/or added.

As part of identifying or selecting a subject, the identification unit 103 identifies next the region where each of the identified first persons is present (ACT 31) based on the measurement values F acquired by the measurement unit 102 for each of the identified first persons.

The identification unit 103 then determines, for every first person, whether the identified region is the first region or the second region (ACT 32).

If the identified region for a first person is determined as the first region (YES in ACT 32), the process proceeds from ACT 32 to ACT 33. If the identified region is determined as the second region (NO in ACT 32), the process proceeds from ACT 32 to ACT 34. The identification unit 103 does not identify any first person present in the second region as a candidate, only those first persons determined to be in the first region can be considered candidates (or "second persons" at this time) (ACT 33).

The identification unit 103 then determines whether ACT 32 and ACT 33 have been executed for all of the identified first persons (ACT 34). If the identification unit 103 has executed the processes for all of the first persons (YES in ACT 34), the process proceeds from ACT 34 to ACT 35. If the identification unit 103 has not yet executed the processes for all of the first persons (NO in ACT 34), the process proceeds from ACT 34 to ACT 32.

The identification unit 103 executes ACT 32 and ACT 33 for all of the first persons. In ACT 32 and ACT 33, the identification unit 103 identifies one or more second persons present in the respective first regions among the first persons based on the image data. In one example, the identification unit 103 identifies the second persons among the first persons based on the measurement values F of the respective first persons. The identification unit 103 identifies the second persons among the first persons according to the identification of the regions where the respective first persons are present based on the measurement values F.

The second detection unit 101 detects a posture of each of the identified second persons based on the image data (ACT 35).

The identification unit 103 determines for every second person, whether the detected posture is the first posture or the second posture (ACT 36).

If the posture of the second person is the first posture (YES in ACT 36), the process proceeds from ACT 36 to ACT 37. If the posture of the second person is the second posture (NO in ACT 36), the process proceeds from ACT 36 to ACT 38. In the present embodiment, the identification unit 103 does not identify the second person in the second posture as a third person. That is, the identification unit 103 does not identify the second person in the second posture as a candidate. The identification unit 103 identifies the second person in the first posture as the third person (ACT 37).

The identification unit 103 determines whether ACT 36 and ACT 37 have been executed for all of the second persons (ACT 38). If the identification unit 103 has executed the processes for all of the second persons (YES in ACT 38), the process proceeds from ACT 38 to ACT 39. If the identification unit 103 has not yet executed the processes for all of the second persons (NO in ACT 38), the process proceeds from ACT 38 to ACT 36.

The identification unit 103 executes ACT 36 and ACT 37 for all of the second persons. In ACT 36 and ACT 37, the identification unit 103 identifies one or more third persons among the second persons based on the detected postures of the respective second persons.

The identification unit 103 identifies one or more candidates based on the identified third persons (ACT 39). In ACT 39, for example, the identification unit 103 identifies one or more third persons as the candidates who satisfy the candidate identification condition.

For example, the identification unit 103 identifies, based on the image data, the candidates who satisfy the candidate identification condition among the first persons by the candidate identification processing as exemplified in FIG. 6.

The candidate identification condition includes being present in the first region but may not include being in the first posture. In such a case, ACT 35 to ACT 38 may be omitted. In ACT 39, the identification unit 103 identifies the candidates among the second persons. For example, the identification unit 103 identifies the second persons as the candidates who satisfy the candidate identification condition.

Figure 7:
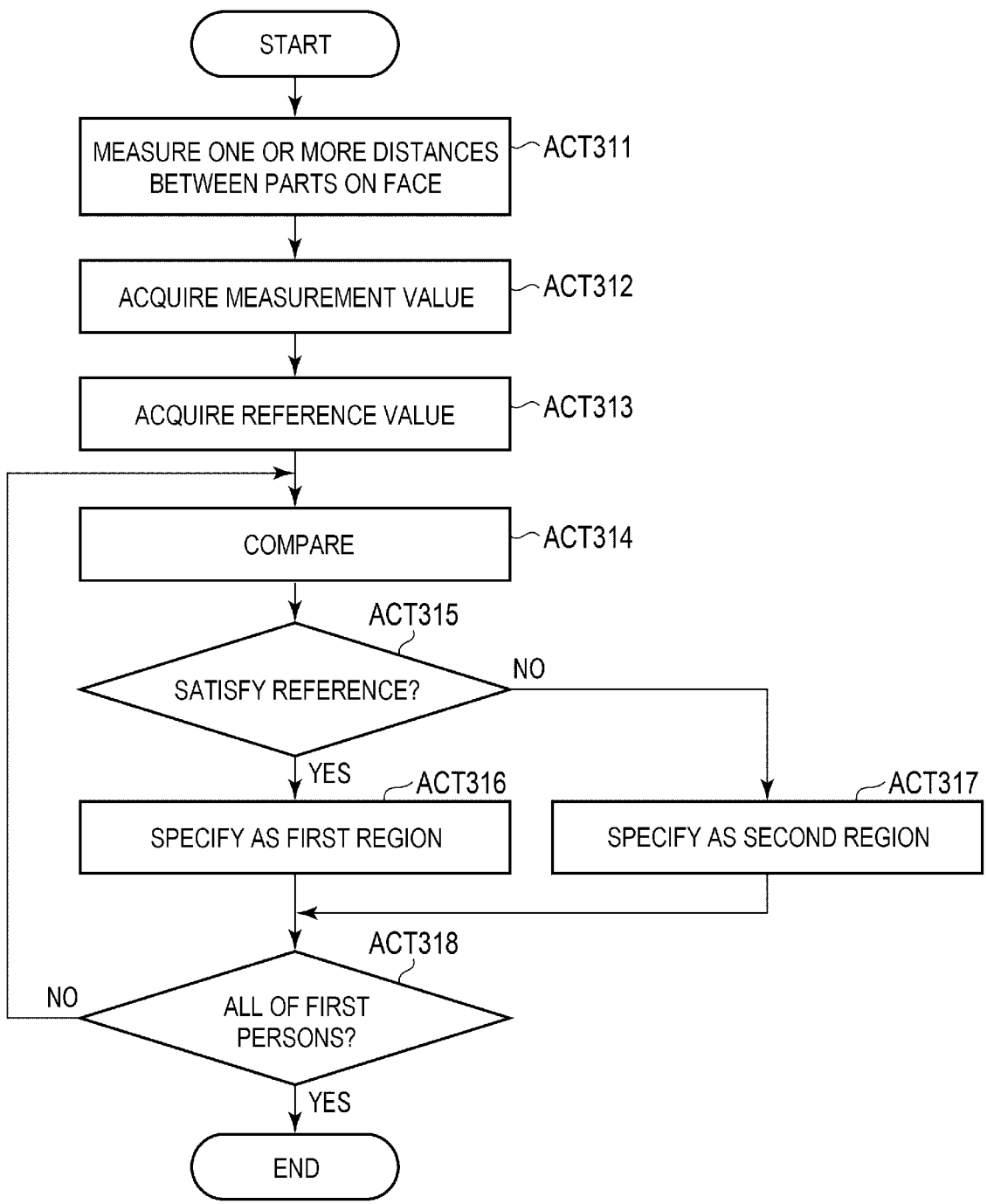
FIG. 7 is a flowchart of an example procedure of region identification according to an embodiment.

FIG. 7 is a flowchart of an example procedure of region identification to be performed by the terminal 1 in ACT 31. The procedure described herein is merely an example and can be changed as appropriate. For example, according to a modified embodiment, an action or a process of the procedure may be appropriately omitted, replaced, and/or added.

The measurement unit 102 measures one or more distances between parts of face of each of the first persons based on the image data (ACT 311).

The measurement unit 102 acquires measurement values F of the respective first persons based on the measurements of the face part distances (ACT 312).

The identification unit 103 acquires the region identification reference value DF from the auxiliary storage device 12 (ACT 313).

The identification unit 103 compares the measurement value F with the region identification reference value DF for every first person (ACT 314).

The identification unit 103 determines whether the measurement value F satisfies the region identification reference for every first person (ACT 315). If the measurement value F satisfies the region identification reference (YES in ACT 315), the process proceeds from ACT 315 to ACT 316. If the measurement value F does not satisfy the region identification reference (NO in ACT 315), the process proceeds from ACT 315 to ACT 317.

The identification unit 103 identifies, as the first region, a region where a first person associated with the measurement value F that satisfies the region identification reference is present (ACT 316). The identification unit 103 identifies, as the second region, a region where a first person associated with the measurement value F that does not satisfies the region identification reference is present (ACT 317).

The identification unit 103 determines whether ACT 314 to ACT 317 have been executed for all of the first persons (ACT 318). If the identification unit 103 has executed the processes for all of the first persons (YES in ACT 318), the process ends. If the identification unit 103 has not executed the processes for all of the first persons (NO in ACT 318), the process proceeds from ACT 318 to ACT 314.

The identification unit 103 repeats ACT 314 to ACT 317 until the processes have been executed for all of the first persons. Accordingly, the identification unit 103 can identify all regions where the first persons are present based on the measurement values F. In one example, the identification unit 103 compares the measurement value F with the region identification reference value DF for every first person. Based on the comparison results, the identification unit 103 identifies the region where each of the first persons is present.

Figure 8:
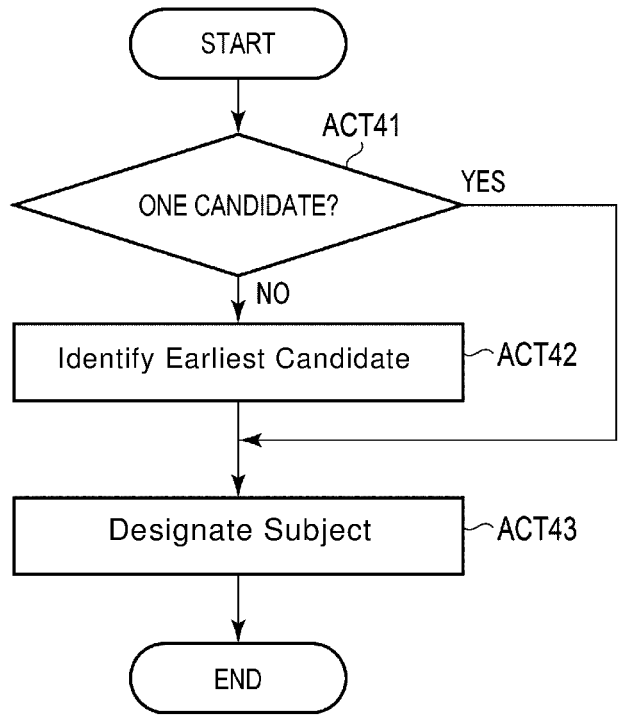
FIG. 8 is a flowchart of an example procedure of target customer identification according to an embodiment.

FIG. 8 is a flowchart of an example procedure of subject identification by the terminal 1 in ACT 4. The procedure described herein is merely an example and can be changed as appropriate. For example, according to a modified embodiment, an action or a process of the procedure may be appropriately omitted, replaced, and/or added.

The identification unit 103 determines whether there is just a single candidate who meets the candidate identification condition (ACT 41). When there is just the one candidate who satisfies the candidate identification condition (YES in ACT 41), the process proceeds from ACT 41 to ACT 43. When the identification unit 103 has identified a plurality of candidates who meet the candidate identification condition (NO in ACT 41), the process proceeds from ACT 41 to ACT 42.

The identification unit 103 identifies the candidate having the earliest detection time for the first gesture by the first detection unit 100 (ACT 42). The identification unit 103 then identifies or regards the one candidate as the subject (ACT 43).

In ACT 43, for example, when just one candidate satisfies the candidate specification condition, the identification unit 103 designates this candidate as the subject (ACT 43). If a plurality of candidates satisfy the candidate identification condition, the candidate having the earliest detection time is designated as the subject.

Figure 9:
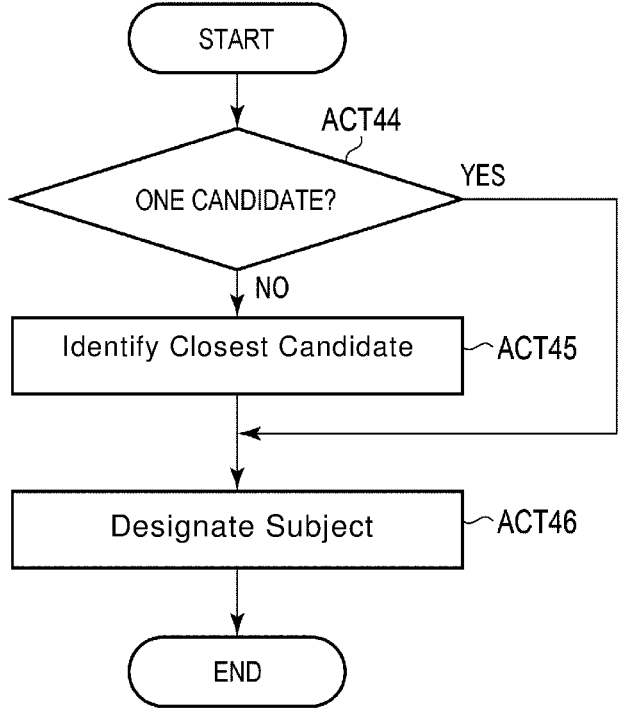
FIG. 9 is a flowchart of an example procedure of target customer identification according to an embodiment.

FIG. 9 is a flowchart of another example procedure of subject identification by the terminal 1 in ACT 4. The procedure described herein is merely an example and can be changed as appropriate. For example, according to a modified embodiment, an action or a process of the procedure may be appropriately omitted, replaced, and/or added.

The identification unit 103 determines whether there is just one candidate who satisfies the candidate identification condition (ACT 44). When there is just the one candidate who satisfies the candidate identification condition (YES in ACT 44), the process proceeds from ACT 44 to ACT 46. When a plurality of candidates satisfy the candidate identification condition (NO in ACT 44), the process proceeds from ACT 44 to ACT 45.

The identification unit 103 then identifies the candidate who is closet to reference position (ACT 45).

The identification unit 103 then designates this candidate as the subject (ACT 46). In ACT 46, if just one candidate satisfies the candidate specification condition, the identification unit 103 designates this one candidate as the subject. When a plurality of candidates meet candidate specification condition, the identification unit 103 designates the candidate closest to the reference position as the subject.

Effects

The terminal 1 according to an embodiment identifies one or more candidates who satisfy the candidate identification condition from among one or more persons whose first gesture has been detected based on the image data. The terminal 1 then identifies one subject among the identified candidates.

A person making the first gesture is likely to be a customer who wants to input an order to the terminal 1. The terminal 1 can identify the subject by narrowing down candidates to only those, making the first gesture. Therefore, with the terminal 1, it is possible to further improve accuracy of identifying, based on the image data, one subject or one target customer among customers seated around the table 2 associated with the terminal 1.

The terminal 1 according to an embodiment specifies the person(s) who have been detected making the first gestures based on the imaging data. The terminal 1 thus identifies one or more candidates from those persons present in the first region.

A person making the first gesture while present in the first region is fairly likely to be a customer who wants to input an order to the terminal 1 rather than a waiter/waitress. A person making the first gesture but who is not presently in the first region is more likely to be a waiter/waitress/server rather than a customer. The terminal 1 can identify a customer making an order by narrowing down the candidates to persons making the first gesture in the first region. The terminal 1 can then exclude the people making the first gesture while not in the first region. Therefore, with such a terminal 1, it is possible to even further improve the accuracy in the identifying of candidates.

The terminal 1 in an embodiment may also identify people in a first posture (e.g., a seated posture) while in the first region to identify candidates.

For example, the posture of the customers seated around the table 2 associated with the terminal 1 is different from the posture of a waiter/waitress who brings dishes or the like to table 2. Thus, a person who is making the first gesture while in the first posture in the first region is generally likely to be a customer who wants to input an order to the terminal 1. A person who is making the first gesture but is not in the first posture within the first region is more likely to be a server than a customer. The terminal 1 can narrow down the candidates to persons making the first gesture while in the first posture in the first region. The terminal 1 can then exclude any person making the first gesture but not in the first posture. Therefore, with a terminal 1, it is possible to even further improve the accuracy of identifying candidates.

The first posture according to the present embodiment is a seated posture or the like distinct from the normal posture of a server bringing dishes or the like to the customers at table 2.

In general, in the present example, customers are most likely to be seated around the table 2 associated with the terminal 1. A server near the table 2 for serving dishes or the like is most likely to be in a standing posture. The terminal 1 can narrow down the candidates to persons making the first gesture while seated in the first region. The terminal 1 can then exclude any person making the first gesture but who is not seated in the first region. Therefore, with a terminal 1, it is possible to improve the accuracy of specifying the candidates.

The terminal 1 according to an embodiment measures, based on imaging data, distances between parts of a face (or other biometric type aspects) of persons whose first gesture is detected. The terminal 1 may use such measured facial part distances to identify the one or more persons present in the first region.

The measured distances between face parts or the like vary depending on the distance between the camera and the person. Thus, when the terminal 1 measures such distances, it is possible to improve identification accuracy with respect to whether a person ins in the first region or not.

Such measurement values according to the present embodiment may be obtained by summing an inner canthus width and an outer canthus width. In the case where the terminal 1 uses a plurality of face part distances, such as the inner canthus width and the outer canthus width, it is possible to even further improve the accuracy of identifying whether the person making the first gesture is present in the first region.

If a plurality of candidates are identified, the terminal 1 according to an embodiment identifies the candidate with the earliest detection time of the first gesture as the subject from among the plurality of candidates. For example, when there are a plurality of candidates, it is an appropriate condition to regard the candidate who first made the first gesture to be the primary customer/subject. Accordingly, by using such an appropriate condition in the case of a plurality of candidates, the terminal 1 can identify the more suitable candidate as the subject who inputs the order to the terminal 1.

The terminal 1 according to an embodiment identifies the candidate having the shortest distance from a reference position as the subject from among the plurality of candidates. Accordingly, when there are a plurality of candidates, the terminal 1 can specify a candidate as the subject who inputs an order to the terminal 1 according to a simple, fair rule.

Modified Embodiments

In an embodiment, the terminal 1 identifies one subject from among several candidates. Embodiments are, however, not limited thereto. For example, the terminal 1 may be configured to accept orders or the like from up to a predetermined number of subjects at the same table 2 or the like. In such a case, the subject identification condition is for identifying the acceptable subjects from among a plurality of candidates who might satisfy a candidate identification condition. In one instance, the subject identification condition may limit the number of subject by reference to the detection times of the first gesture by the first detection unit 100 for the candidates. That is, those candidates up to the limit number may be identified as subjects according to the detected timing of the making of the first gesture by each candidate. In such an instance, the identification unit 103 identifies, the subjects among the plurality of candidates in the order of detection timing from the earliest to the latest. In another instance, the subject identification condition limits subjects by distance from the reference position. In such an instance, the identification unit 103 identifies those subjects from among the plurality of candidates in the order of distance from the reference position, such that those closest to the reference position are selected before the those farther, up to the limit number of subjects In an embodiment, the terminal 1 is used in a store such as a restaurant, and the recognizing of a subject who inputs an order to the terminal 1 is described, but the terminal 1 is not limited thereto. The present disclosure and a terminal 1 according to embodiments thereof can be applied not only to a restaurant but also to various other places where it may be necessary or preferable to identify one or more particular subjects making various gestures or the like. For example, a terminal 1 according to an embodiment may be utilized at a conference, a virtual conference, a public speech, or the like. In such an example, the terminal 1 may be provided to recognize a person who wants to speak or a person who wants to ask a question from those also in attendance.

An information processing device may be implemented by a device such as the terminal 1 or by a plurality of devices having distributed functions.

A program may be transferred either by being stored in a device or otherwise. In the latter case, a program may be transferred via a network or by being recorded in a recording medium. The recording medium may be a non-transitory tangible medium. The recording medium may be a computer-readable medium. The recording medium may, in general, be any medium, such as a CD-ROM or a memory card, as long as the medium can store a program and can be read by a computer. A form thereof is not particularly limited.

While certain embodiments have been described, these embodiments have been presented by way of example only and are not intended to limit the scope of the disclosure. Indeed, the novel embodiments described herein may be embodied in a variety of other forms; furthermore, various omissions, substitutions and changes in the form of the embodiments described herein may be made without depart-

What is claimed is:

1. An information processing device, comprising:
a display screen configured to display information to persons within a viewing range of a camera; and
a processor configured to:
detect a person making a particular gesture in image data from the camera,
identify each person making the particular gesture in the image data as a first type person,
identify each first type person meeting a candidate condition in the image data as a candidate,
designate one candidate as a subject according to a subject selection condition when there are multiple identified candidates, and
detect gestured-based input for an ordering process only from the currently designated subject in additional image data from the camera after the subject has been designated until the ordering process has been concluded by the subject.

2. The information processing device according to claim 1, further comprising:
the camera.

3. The information processing device according to claim 1, wherein the image data comprises video frames.

4. The information processing device according to claim 1, wherein the particular gesture is a hand gesture.

5. The information processing device according to claim 1, wherein the candidate condition requires the first type person to be in a particular region, and
the processor is further configured to identify the region of each first type person based on a comparison of facial measurements of the first type person to a reference value.

6. The information processing device according to claim 5, wherein
the candidate condition additionally requires the first type person to have been in a particular posture when making the particular gesture, and
the processor is further configured to identify the posture of each first type person based on analysis of the image data.

7. The information processing device according to claim 6, wherein the processor designates as the subject the candidate who among the candidates first made the particular gesture.

8. The information processing device according to claim 6, wherein the processor designates as the subject the candidate who among the candidates is closest to a reference position.

9. The information processing device according to claim 1, wherein
the candidate condition requires the first type person to have been in a particular posture when making the particular gesture, and
the processor is further configured to identify the posture of each first type person based on analysis of the image data.

10. A gesture-based ordering terminal, comprising:
a display screen to display information related to orders;
a camera positioned to capture images of people in a region in front of the display screen; and
a processor configured to:
detect a person making a particular gesture in image data from the camera,
identify each person making the particular gesture in the image data as a first type person,
identify each first type person meeting a candidate condition in the image data as a candidate,
designate one candidate as a subject according to a subject selection condition when there are multiple identified candidates, and
detect gestured-based input for an ordering process only from the currently designated subject in additional image data from the camera after the subject has been designated until the ordering process has been concluded by the subject.

11. The gesture-based ordering terminal according to claim 10, wherein
the candidate condition requires the first type person to be in a particular region in front of the display screen, and
the processor is further configured to identify the region of each first type person based on a comparison of facial measurements of the first type person to a reference value.

12. The gesture-based ordering terminal according to claim 11, wherein
the candidate condition additionally requires the first type person to have been in a particular posture when making the particular gesture, and
the processor is further configured to identify the posture of each first type person based on analysis of the image data.

13. The gesture-based ordering terminal according to claim 12, wherein the processor designates as the subject the candidate who among the candidates first made the particular gesture.

14. The gesture-based ordering terminal according to claim 12, wherein the processor designates as the subject the candidate who among the candidates is closest to a reference position.

15. The gesture-based ordering terminal according to claim 10, wherein
the candidate condition requires the first type person to have been seated at a table in front of the display screen when making the particular gesture, and
the processor is further configured to identify whether each first type person was in a seated posture based on analysis of the image data.

16. A non-transitory computer-readable medium storing a program that, when executed, causes a computer to perform a method comprising:
displaying information for an ordering process on a display screen within a viewing range of a camera;
detecting a person making a particular gesture in image data from the camera;
identifying each person making the particular gesture in the image data as a first type person;
identifying each first type person meeting a candidate condition in the image data as a candidate;
designating one candidate as a subject according to a subject selection condition when there are multiple identified candidates; and
detecting gestured-based input for the ordering process only from the currently designated subject in additional image data from the camera after the subject has been designated until the ordering process has been concluded by the subject.

17. The non-transitory computer-readable medium according to claim 16, wherein the image data comprises video frames.

18. The non-transitory computer-readable medium according to claim 16, wherein the particular gesture is a hand gesture.

19. The non-transitory computer-readable medium according to claim 16, wherein the candidate condition requires the first type person to have been in a particular posture when making the particular gesture.

* * * * *